United States Patent [19]
Gold et al.

[11] Patent Number: 5,813,742
[45] Date of Patent: Sep. 29, 1998

[54] LAYERED DISPLAY SYSTEM AND METHOD FOR VOLUMETRIC PRESENTATION

[75] Inventors: Ronald S. Gold, Fullerton; Jerry E. Freeman, Irvine, both of Calif.

[73] Assignee: Hughes Electronics, El Segundo, Calif.

[21] Appl. No.: 636,197

[22] Filed: Apr. 22, 1996

[51] Int. Cl.⁶ ................................................. G03B 21/14
[52] U.S. Cl. ................................. 353/88; 353/10; 345/4
[58] Field of Search ................................. 353/7, 10, 122, 353/88; 349/15; 359/458, 462, 478, 4; 348/42, 51, 52, 55, 56; 345/4, 5, 6

[56] References Cited

U.S. PATENT DOCUMENTS

| | | | |
|---|---|---|---|
| 3,989,355 | 11/1976 | Wilmer | 345/4 |
| 4,472,737 | 9/1984 | Iwasaki | 358/88 |
| 4,562,463 | 12/1985 | Lipton . | |
| 4,670,744 | 6/1987 | Buzak | 345/6 |
| 4,792,850 | 12/1988 | Liptoh et al. | 349/15 |
| 4,974,957 | 12/1990 | Kaelin | 353/10 |

FOREIGN PATENT DOCUMENTS

91/15930  10/1991  WIPO  ........................... H04N 13/14

*Primary Examiner*—William Dowling
*Attorney, Agent, or Firm*—Leonard A. Alkov; William C. Schubert; Glenn H. Lenzen, Jr.

[57] ABSTRACT

A volumetric display system includes a display member which has a plurality of electrically-responsive optical shutters arranged in a layered relationship. The optical shutters include layers of a liquid crystal which preferably can be formed in geometric shapes which enhance the volumetric display. A projection system projects successive images onto the display member while successive ones of the optical shutters are switched into their translucent state. At any moment in time, all optical shutters except the successive one are maintained in a transparent state.

27 Claims, 3 Drawing Sheets

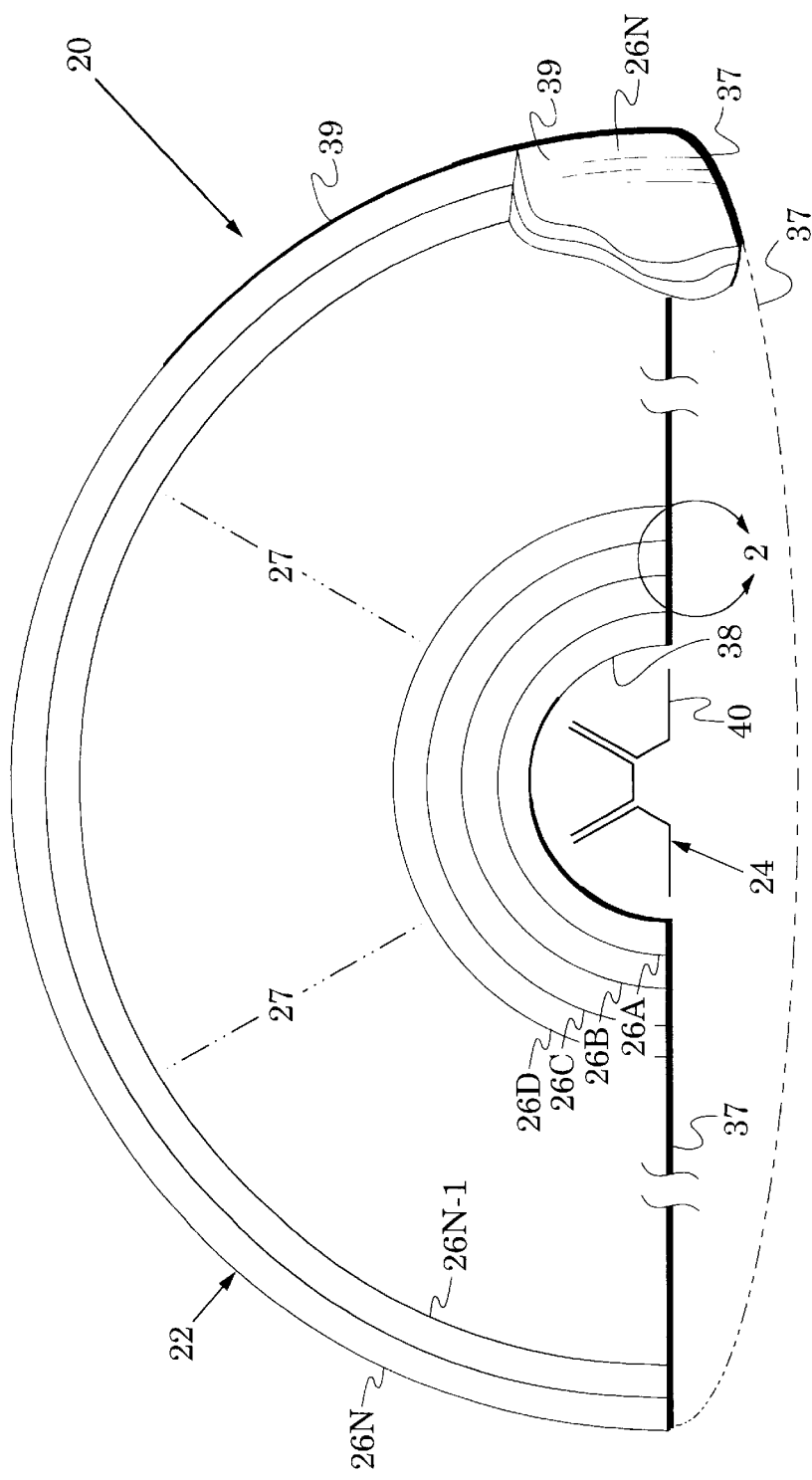
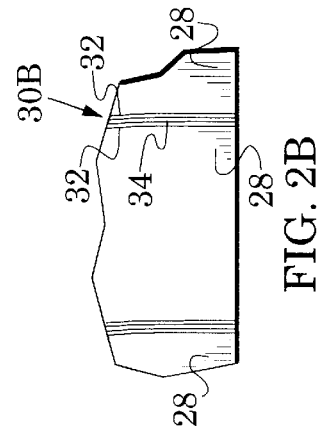
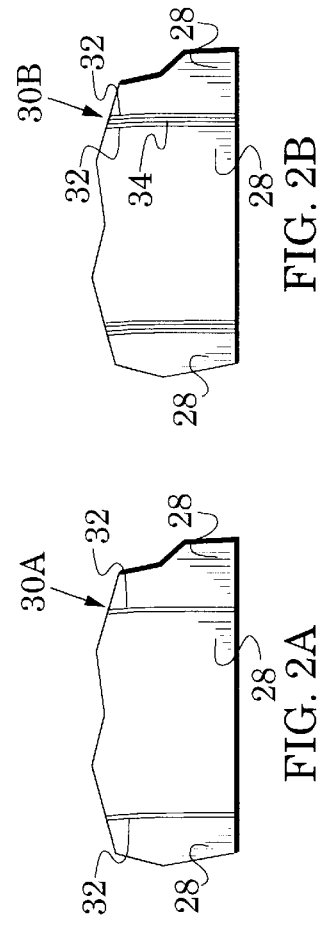

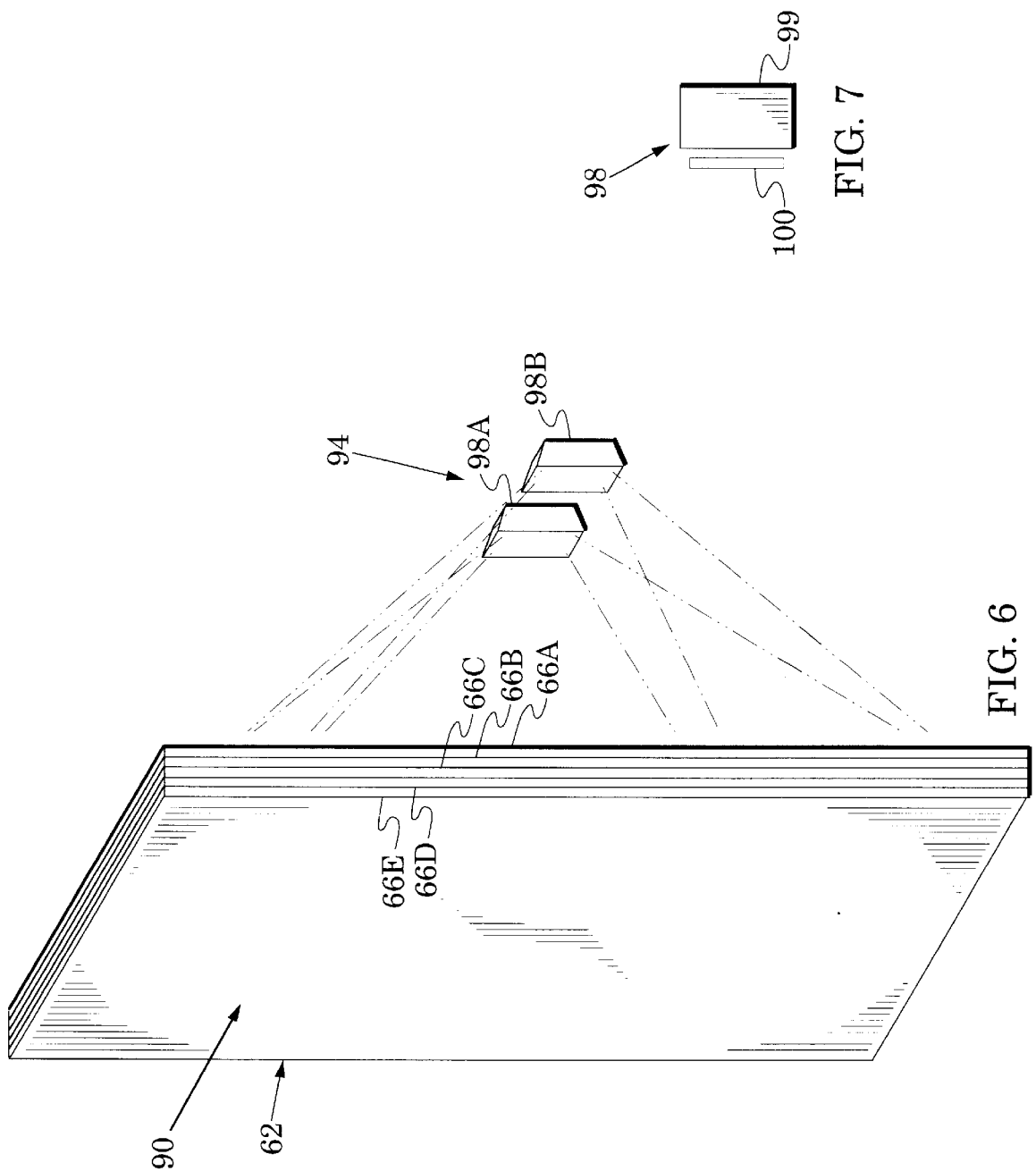

LAYERED DISPLAY SYSTEM AND METHOD FOR VOLUMETRIC PRESENTATION

BACKGROUND OF THE INVENTION

1. Field of the Invention

The present invention relates generally to optical display systems and more particularly to volumetric display systems.

2. Description of the Related Art

Many images contain volumetric, i.e., three-dimensional, data. Examples of such images include airport traffic-control displays, military tactical and strategic displays and medical imaging displays (e.g., magnetic resonance imaging (MRI) and computerized axial tomography (CAT)). Significant volumetric data is lost if such volumetric images are presented on a single-surface display, i.e., a display which is locally two-dimensional.

Accordingly, various volumetric display systems have been developed. These include stereoscopic display systems, autostereoscopic display systems and systems which combine lasers with spinning mirrors, spinning helixes or rotating cylindrical holographic elements. Although these systems may display volumetric data, they often have insufficient resolution and generate visual artifacts. In addition, they typically involve moving parts and are complex and expensive.

SUMMARY OF THE INVENTION

The present invention is directed to a simple, inexpensive volumetric display system which can display static and real time volumetric images for individual or group viewing without requiring moving parts, light-attenuating elements (e.g., polarizers) or viewing aids.

These goals are achieved with the realization that layers of a volumetric image can be realistically combined to form the image by projecting them successively on a layered arrangement of electrically-responsive optical shutters while switching successive ones of the optical shutters into a translucent state and maintaining all others in a transmissive state. The layered optical shutters are preferably realized with materials which can be formed in various geometric shapes. The geometric shape can be chosen to enhance the volumetric display by approximating the shape of the original data source, i.e., the optical shutters are spatially arranged to mimic the spatial arrangement of the data.

In one embodiment, a volumetric display system includes a display member which has a plurality of electrically-responsive liquid crystal layers and a projection system which is positioned to project successive images on the display member. The layers are formed with liquid crystal materials, e.g., a polymer dispersed liquid crystal or a polymer-stabilized, cholesteric-texture liquid crystal, which can be easily shaped. To facilitate switching between its translucent and transmissive states, each liquid crystal layer is adjoined with electrodes of an optically-transparent material, e.g., indium-tin oxide. The images are successively projected onto the display member with conventional projectors. A completely solid state system is realized with a solid state projector, e.g., an active matrix liquid crystal display and a projecting lens.

Preferably, the projection rate is sufficient to prevent flicker perception by an observer. If desired, the data rate of projector system components can be reduced by including a plurality of image sources which each project onto a respective segment of the display member. The component data rate can also be reduced by including a plurality of image sources which each project onto a respective group of the display member's optical shutters.

Display systems of the invention can display real time, full-color images whose resolution is only limited by the resolution of the projection system. The display brightness is enhanced because the system does not require the use of light-attenuating optical elements, e.g., polarizers.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectioned, elevation view of a volumetric display system in accordance with the present invention;

FIG. 2A is an enlarged view of an electrode system within the curved line 2 in FIG. 1;

FIG. 2B is an enlarged view of another electrode system within the curved line 2 in FIG. 1;

FIG. 6 is a perspective view of another volumetric display system; and

FIG. 7 is a side elevation view of a projector in the volumetric display system of FIG. 6.

DETAILED DESCRIPTION OF THE PREFERRED EMBODIMENTS

Figure 3:
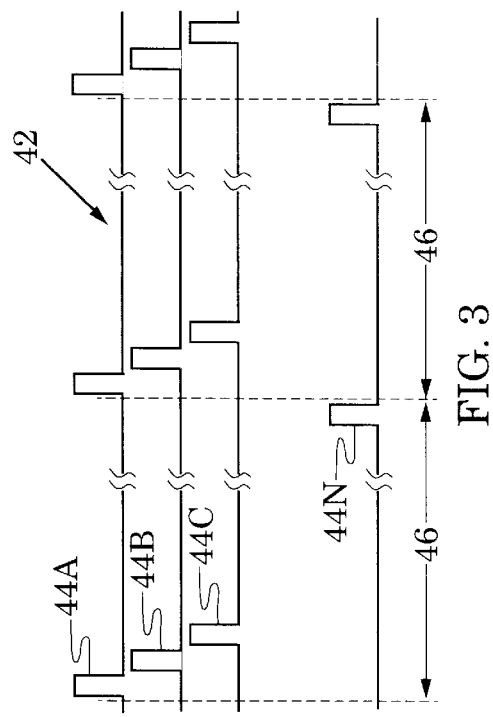
FIG. 3 is a timing diagram which shows timing pulses applied to optical shutters in the volumetric display system of FIG. 1.

FIG. 1 illustrates a volumetric display system 20 which includes a display member 22 and a projection system 24. The display member 22 has a plurality of electrically-responsive optical shutters 26A–26N (in which N represents a selectable number) which are arranged in a layered relationship (for clarity of illustration, intervening layers between optical shutters 26D and 26N-1 are indicated by broken extension lines 27). Each of the optical shutters 26A–26N can be selectively switched between a translucent state and a transmissive state.

As shown in FIG. 2A, each of the optical shutters 26A–26N includes a liquid crystal layer 28 and an electrode system which applies voltages that place the liquid crystal layer 28 in its translucent and transmissive states. FIG. 2A illustrates one embodiment 30A of the electrode system which includes a layer 32 of an optically-transparent, electrically-conductive material (e.g., indium oxide, tin oxide or indium-tin oxide) positioned between each adjacent pair of the liquid crystal layers 28.

FIG. 2B illustrates another electrode system embodiment 30B which includes two optically-transparent, electrically-conductive layers 32 between each adjacent pair of liquid crystal layers 28 and a sheet 34 of an optically-transparent, electrically-insulative material, e.g., silicon dioxide ($SiO_2$), positioned between the layers 32.

Although the electrode system 30A is simpler, it requires a more complex electrical system because the voltage applied to the liquid crystal layers 28 which are in a transmissive state is a function of their location relative to a selected liquid crystal layer 28 which is in a translucent state. Because each liquid crystal layer 28 is insulated from its neighbors in the electrode system 30B, the switching voltages applied to each liquid crystal layer 28 are independent of the state of neighboring liquid crystal layers. In the electrode system 30B, one of the electrodes 32 of each liquid crystal layer 28 could be grounded and switching voltages applied to the other electrode.

In the volumetric display system 20, the display member 22 is formed in a hemispherical shape with a base 37 (the extension of the base from the sectioned portion of the display member is indicated by a broken line). The inner optical shutter 26A has a hemispherical face 38 which extends upward from the base 37 and the outer optical shutter 26N has an outer hemispherical face 39. The projection system 24 includes one or more projectors 40 which are directed at the face 38. The projectors 40 are positioned and configured so that each would illuminate a different solid angle of the display member 22 (for clarity of illustration, only projectors in the sectioned plane are shown).

FIG. 3 illustrates an exemplary timing diagram 42 which shows voltage pulses that are applied to the display member 22 during operation of the volumetric display system 20 (depending on the selected optical shutters, the pulse level may be positive, negative or zero). In this diagram, pulse 44A is applied to optical shutter 26A to switch it to its translucent state. At this time, a voltage corresponding to the transparent state is applied to all others of the optical shutters 26. Similarly, the pulse 44B is applied to optical shutter 26B to switch it to its translucent state while all other optical shutters are maintained in their transparent state. This sequence of pulses continues until pulse 44N has been applied to optical shutter 26N. Each set of pulses 44A, 44B - - - 44N forms one frame which is completed in a frame time 46. Thus, the frame rate is the inverse of the frame time 46.

The volumetric display system 20 is especially suited for displaying a volumetric image which has N hemispherical layers. In operation, the pulses of the timing diagram 42 are applied to the optical shutters 26A–26N and, at the same time, successive images are projected on the display member 22 by the projection system 24. Each of the successive images corresponds to a layer of the original volumetric image and that layer corresponds to one of the optical shutters 26A–26N.

For example, a first image which corresponds to the layer of optical shutter 26A, is projected onto the display member 22 during the time in which pulse 44A of the timing diagram 40 has caused that optical shutter to be in its translucent state. A second image, which corresponds to the layer of optical shutter 26B, is projected onto the display member 22 during the time in which pulse 44B has caused that optical shutter to be in its translucent state. This operational sequence of projecting successive images onto the display member and switching successive ones of the optical shutters into their translucent state continues until an Nth image is projected onto the display member 22 during pulse 44N. Except when it becomes a successive one, each optical shutter is maintained in its transmissive state. This sequence completes the display of one frame of the volumetric image.

In its translucent state, a selected optical shutter permits the passage of light but with a measure of scattering and diffusion. Because the other optical shutters are in their transparent state, light from a selected image is projected through the inner face 38 and upon the selected optical shutter and the image on that shutter is visible from the outer face 39. If the coordinated sequencing of pulses 44 and projected images is repeated at a frame rate which is sufficient to avoid flicker, an observer looking into the face 39 will see a true volumetric image because of the layered relationship of the optical shutters 26.

The liquid crystal layers 28 of FIGS. 2A and 2B have a finite response time which is typically measured in milliseconds. Consequently, the appearance of the volumetric display may be improved by spacing the switching pulses 44 apart as indicated in the timing diagram 42 of FIG. 3. This insures that each selected image is displayed on its corresponding layer and not an adjacent layer.

Liquid crystals for realizing the volumetric display systems of the invention are preferably chosen from those liquid crystals, e.g., polymer dispersed liquid crystals and polymer-stabilized, cholesteric-texture liquid crystals, which can be shaped into geometric forms that enhance the volumetric image. Polymer-based liquid crystals typically carry a plurality of liquid crystal droplets dispersed in a polymer matrix. Because the polymer matrix can be easily shaped, these liquid crystals are particularly suited for use in display members of the invention.

The selected geometric shape of the display member preferably mimics the spatial relationship of the original data source of the volumetric image. For example, the hemispherical form of the volumetric display system 20 might be suitable for an airport traffic-control display in which successive layers display signal returns at successive distances from a radar transmitter. The number of layers in the display member can be selected to match or approximate the layers in the original data source.

The voltage levels of the switching pulses 44 of FIG. 3 is determined by the selected liquid crystal material. For example, a positive voltage and a voltage of approximately zero correspond respectively to the transparent and translucent states of typical polymer dispersed liquid crystals.

Figure 4:
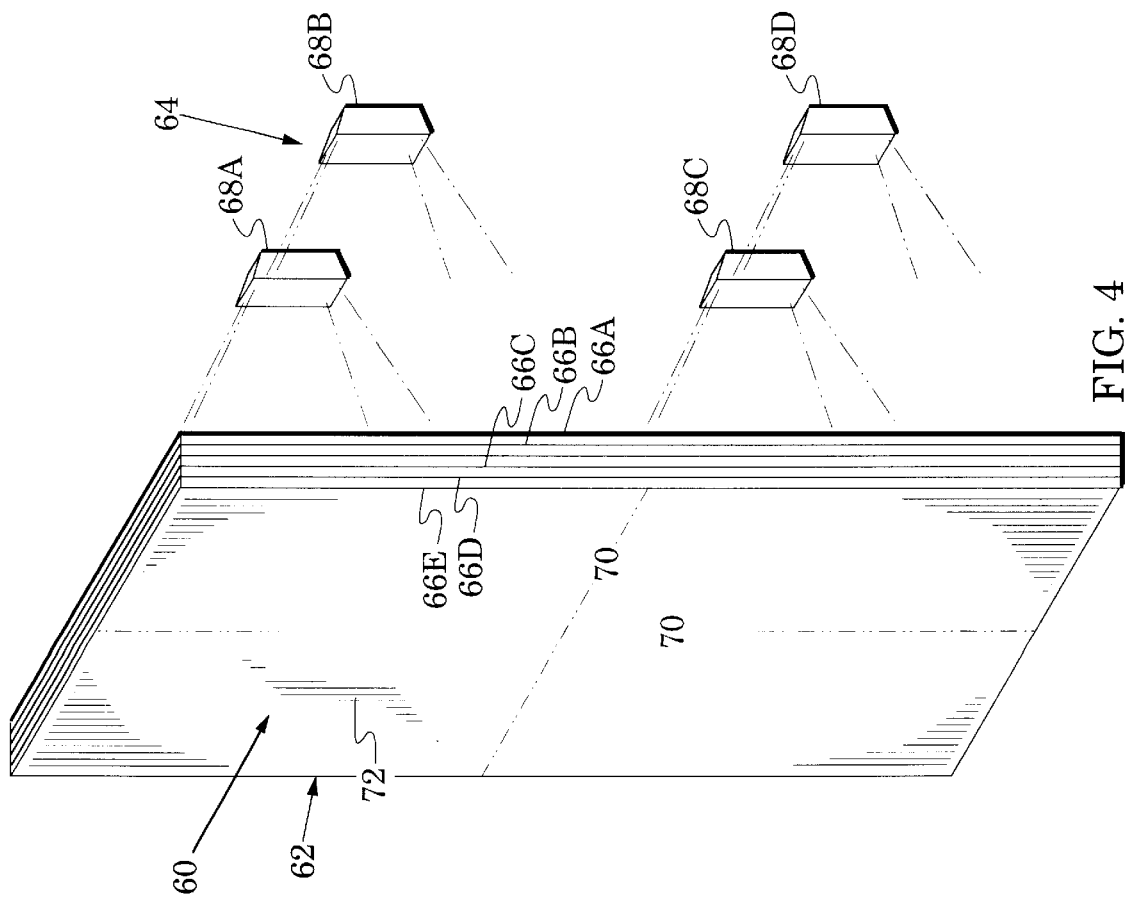
FIG. 4 is a perspective view of another volumetric display system.

FIG. 4 illustrates another volumetric display system embodiment 60 which includes a display member 62 and a projection system 64. The display member 62 has five electrically-responsive optical shutters 66A–66E which are arranged in a layered relationship and the projection system 64 includes four projectors 66A–66D.

In contrast with the geometric shape of the display member 22 of FIG. 1, the display member 62 is formed to have a planar shape. This shape might, for example, enhance an MRI display of a body member, e.g., a brain, in which each layer displays a planar slice of MRI data at a different depth in the body member.

Each of the four projectors 68 is positioned to project onto a respective segment of the display member 62. The four segments are indicated by broken lines 70 on the display member 62. For example, projector 68A projects onto all optical shutters 66A–66D but only over a segment 72 of these shutters. This projection system arrangement significantly lowers the operating data rate for each projector.

Figure 5:
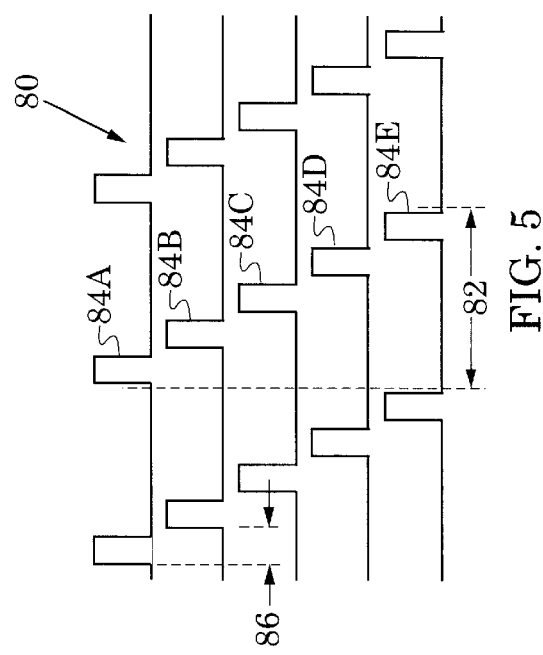
FIG. 5 is a timing diagram which shows timing pulses applied to optical shutters in the volumetric display system of FIG. 4.

A timing diagram 80 for the projection system 64 is shown in FIG. 5. In each frame time 82, pulses 84A–84E respectively switch optical shutters 66A–66E into their translucent states. A field time 86 is defined to be the time between initiation of translucent states of adjacent optical shutters. The data loading rate of each projector is reduced because each of the four projectors only has to project over its respective segment of the display member 62. If the image on each optical shutter were comprised of 1024×1024 pixels, then each of the four segments would be comprised of 512×512 pixels. Thus, by having four projectors rather than one, the number of pixels to be loaded into a given projector during the field time 86 has been reduced by a factor of four.

FIG. 6 illustrates another volumetric display system 90 which is similar to the volumetric display system of FIG. 4 with like elements indicated by like reference numbers. However, the system 90 has a projection system 94 which includes two projectors 98A and 98B. In this projection system, each projector projects over the entire extent of selected ones of the optical shutters in the display member 62.

In an exemplary timing arrangement, projector 98A projects onto optical shutter 66A, projector 98B projects onto optical shutter 66B, projector 98A projects onto optical shutter 66C and so on. The projectors must be loaded with the total number of pixels projected onto each optical shutter but they their loading time is substantially two of the field times 86 in FIG. 5. Compared to the use of a single projector, this arrangement cuts the data loading rate in half.

FIG. 7 illustrates one of the projectors 98 of FIG. 6. The projector 98 includes a conventional image source 99, e.g., a cathode ray tube, an active matrix liquid crystal display or a laser-based display, and a projector lens 100 which relays the image generated by the image source onto the display member 62. These image sources may generate an image with any conventional technique, e.g., raster or random pixel scanning, and with any conventional display medium, e.g., solid state or vacuum tube.

A single-layer prototype has been fabricated with a polymer dispersed liquid crystal. High-quality, full-color images were displayed when the liquid crystal was placed in its translucent state.

Volumetric display systems of the invention are inexpensive and simple (e.g., they have no moving parts). The brightness of the display systems is enhanced because they do not require light-attenuating components such as polarizers. With their layered and contoured display members, these systems realize a true volumetric display in contrast to stereoscopic displays which generate a perception of depth. The display member can be viewed from any position in front of its display face, e.g., the face 39 in FIG. 1, unlike some conventional display systems which require the observer's eyes to be in discrete pupil locations. The systems can display full color volumetric images which are suitable for non real time applications, e.g., MRI imaging, or real time applications, e.g., airport traffic-control.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A volumetric display system, comprising:
   a hemispheric-shaped display member having a plurality of electrically-responsive optical shutters which each has a translucent state and a transmissive state and wherein said optical shutters are arranged in a layered relationship; and
   a projection system having at least one image source and configured to project successive images on said optical shutters;
   each of said optical shutters displaying selected ones of said images by being placed in said translucent state while others of said optical shutters are placed in their transmissive states.

2. A volumetric display system, comprising:
   a display member having a plurality of electrically-responsive optical shutters which each has a translucent state and a transmissive state and wherein said optical shutters are arranged in a layered relationship and wherein each of said optical shutters includes:
     an electrically-responsive, liquid crystal layer which has a translucent state and a transmissive state and which can be configured in selected geometric shapes; and
     b) an optically-transparent electrode system arranged to receive an electric potential and apply said electric potential across said liquid crystal layer wherein said electrode system includes at least one indium oxide layer positioned between each adjacent pair of optical shutters; and
   a projection system having at least one image source and configured to project successive images on said optical shutters;
   each of said optical shutters displaying selected ones of said images by being placed in said translucent state while others of said optical shutters are placed in their transmissive states.

3. A volumetric display system, comprising:
   a display member having a plurality of electrically-responsive optical shutters which each has a translucent state and a transmissive state and wherein said optical shutters are arranged in a layered relationship and wherein each of said optical shutters includes:
     a) an electrically-responsive, liquid crystal layer which has a translucent state and a transmissive state and which can be configured in selected geometric shapes; and
     b) an optically-transparent electrode system arranged to receive an electric potential and apply said electric potential across said liquid crystal layer wherein said electrode system includes at least one tin oxide layer positioned between each adjacent pair of optical shutters; and
   a projection system having at least one image source and configured to project successive images on said optical shutters;
   each of said optical shutters displaying selected ones of said images by being placed in said translucent state while others of said optical shutters are placed in their transmissive states.

4. A volumetric display system, comprising:
   a display member having a plurality of electrically-responsive optical shutters which each has a translucent state and a transmissive state and wherein said optical shutters are arranged in a layered relationship and wherein each of said optical shutters includes:
     a) an electrically-responsive, liquid crystal layer which has a translucent state and a transmissive state and which can be configured in selected geometric shapes; and
     b) an optically-transparent electrode system arranged to receive an electric potential and apply said electric potential across said liquid crystal layer wherein said electrode system includes at least one indium-tin oxide layer positioned between each adjacent pair of optical shutters; and
   a projection system having at least one image source and configured to project successive images on said optical shutters;

each of said optical shutters displaying selected ones of said images by being placed in said translucent state while others of said optical shutters are placed in their transmissive states.

5. A volumetric display system, comprising:
a display member having a plurality of electrically-responsive optical shutters which each has a translucent state and a transmissive state and wherein said optical shutters are arranged in a layered relationship and further including an optically-transparent insulative sheet positioned between each pair of said optical shutters; and
a projection system having at least one image source and configured to project successive images on said optical shutters;
each of said optical shutters displaying selected ones of said images by being placed in said translucent state while others of said optical shutters are placed in their transmissive states.

6. The volumetric display system of claim 5, wherein said liquid crystal layer is a polymer dispersed liquid crystal layer.

7. The volumetric display system of claim 5, wherein said liquid crystal layer is a polymer-stabilized cholesteric-texture liquid crystal layer.

8. The volumetric projection system of claim 5, wherein said insulative sheet is a silicon dioxide sheet.

9. The volumetric display system of claim 5, wherein said projection system includes a plurality of image sources and is configured to project each of said image sources onto a respective segment of said display member.

10. The volumetric display system of claim 5, wherein said projection system includes a plurality of image sources which are configured to each project images on selected ones of said optical shutters to facilitate a faster projection rate of said successive images.

11. The volumetric display system of claim 5, wherein said image source includes:
a cathode ray tube; and
a projector lens positioned to project an image on said cathode ray tube onto said display member.

12. The volumetric display system of claim 5, wherein said image source includes:
an active matrix liquid crystal display; and
a projector lens positioned to project an image on said active matrix liquid crystal display onto said display member.

13. The volumetric display system of claim 5, wherein said image source includes:
a laser-based display; and
a projector lens positioned to project an image on said laser-based display onto said display member.

14. A volumetric display member for displaying successive projected images, comprising a plurality of electrically responsive optical shutters which each have a transmissive state and a translucent state wherein said optical shutters are configured to have a geometric shape of a hemisphere and are arranged in a layered relationship.

15. A volumetric display member for displaying successive projected images, comprising a plurality of electrically responsive optical shutters which each have a transmissive state and a translucent state wherein said optical shutters are configured to have a selected geometric shape and are arranged in a layered relationship and wherein each of said optical shutters includes:
an electrically-responsive, liquid crystal layer which has a translucent state and a transmissive state and which can be configured in selected geometric shapes; and
an optically-transparent electrode system arranged to receive an electric potential and apply said electric potential across said liquid crystal layer, wherein said electrode system includes at least one indium oxide layer positioned between each adjacent pair of optical shutters.

16. A volumetric display member for displaying successive projected images, comprising a plurality of electrically responsive optical shutters which each have a transmissive state and a translucent state wherein said optical shutters are configured to have a selected geometric shape and are arranged in a layered relationship and wherein each of said optical shutters includes:
an electrically-responsive, liquid crystal layer which has a translucent state and a transmissive state and which can be configured in selected geometric shapes; and
an optically-transparent electrode system arranged to receive an electric potential and apply said electric potential across said liquid crystal layer, wherein said electrode system includes at least one tin oxide layer positioned between each adjacent pair of optical shutters.

17. A volumetric display member for displaying successive projected images, comprising a plurality of electrically responsive optical shutters which each have a transmissive state and a translucent state wherein said optical shutters are configured to have a selected geometric shape and are arranged in a layered relationship and wherein each of said optical shutters includes:
an electrically-responsive, liquid crystal layer which has a translucent state and a transmissive state and which can be configured in selected geometric shapes; and
an optically-transparent electrode system arranged to receive an electric potential and apply said electric potential across said liquid crystal layer, wherein said electrode system includes at least one indium-tin oxide layer positioned between each adjacent pair of optical shutters.

18. A volumetric display member for displaying successive projected images, comprising:
a plurality of electrically responsive optical shutters which each have a transmissive state and a translucent state wherein said optical shutters are configured to have a selected geometric shape and are arranged in a layered relationship and wherein each of said optical shutters includes:
a) an electrically-responsive, liquid crystal layer which has a translucent state and a transmissive state and which can be configured in selected geometric shapes; and
b) an optically-transparent electrode system arranged to receive an electric potential and apply said electric potential across said liquid crystal layer, and
an optically-transparent insulative sheet positioned between each of said optical shutters.

19. The volumetric display member of claim 18, wherein said liquid crystal layer is a polymer dispersed liquid crystal layer.

20. The volumetric display member of claim 18, wherein said liquid crystal layer is a polymer-stabilized cholesteric-texture liquid crystal layer.

21. The volumetric projection system of claim 18, wherein said optically-transparent insulative sheet comprises silicon dioxide.

22. A method of forming a volumetric display member for the display of a plurality of spatially-separated images, comprising the steps of:

shaping a polymer-based liquid crystal medium to form a plurality of display-member layers with similar geometric shapes;

positioning said display-member layers in a layered arrangement; and positioning a plurality of optically-transparent electrodes so that each of said display-member layers lies between a pair of said electrodes, each of said display-member layers having transluscent and transmissive states which are selectively responsive to electric potentials applied to their respective electrodes.

23. The method of claim 22, wherein said polymer-based liquid crystal medium comprises polymer dispersed liquid crystals.

24. The method of claim 22, wherein said polymer-based liquid crystal medium comprises polymer-stabilized, cholesteric-texture liquid crystals.

25. The method of claim 22, further including the steps of:

positioning a pair of said electrodes between adjacent display-member layers, and inserting an optically-transparent electrically-insulative sheet between said pairs of electrodes.

26. The method of claim 25, wherein said optically-transparent electrically-insulative sheet comprises silicon dioxide.

27. The method of claim 22, wherein said geometric shapes are hemispheres.

* * * * *